United States Patent Office 3,749,736
Patented July 31, 1973

3,749,736
5-ETHERS OF 1,3-BENZOXATHIOL-2-ONE
John D. Diekman, Mountain View, Calif., assignor to Zoecon Corporation, Palo Alto, Calif.
No Drawing. Filed Mar. 24, 1971, Ser. No. 127,803
Int. Cl. C07d 89/06
U.S. Cl. 260—327 M
17 Claims

ABSTRACT OF THE DISCLOSURE

Novel 5-substituted-1,3-benzoxathiol-2-one compounds prepared by the alkylation of 5-hydroxy-1,3-benzoxathiol-2-one useful for control of insects.

---

This invention relates to novel 5-substituted-1,3-benzoxathiol-2-one compounds, the preparation thereof, and the control of insects. The novel compounds are represented by the following Formula I:

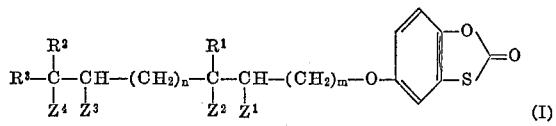

wherein, each of $R^1$, $R^2$ and $R^3$ is lower alkyl;
$Z^1$ is hydrogen and $Z^2$ is hydrogen or, taken with $Z^1$, a carbon-carbon bond;
$Z^3$ is hydrogen;
$Z^4$ is hydrogen, bromo, chloro, fluoro, —$OR^4$ or, taken with $Z^3$, a carbon-carbon bond or oxido;
$n$ is the positive integer one, two or three;
$m$ is zero or the positive integer one or two, provided that when $m$ is zero—then $Z^2$ is hydrogen; and
$R^4$ is hydrogen, lower alkyl or carboxylic acyl.

The term "lower alkyl," as used herein, refers to an alkyl group, straight or branched, having a chain length of one to six carbon atoms. The term "carboxylic acyl," as used herein, refers to the acyl group of a carboxylic acyl, anhydride or halide. The acyl group is determined by the particular carboxylic acid halide or carboxylic acid anhydride employed in the esterification of a compound of Formula I where $R^4$ is hydrogen. Although no upper limitation need be placed on the number of carbon atoms contained in the acyl group within the scope of the present invention, generally it contains from one to eighteen carbon atoms. Typical esters of the present invention include alkanoate of 1 to 18 carbon atoms, such as formate, acetate, propionate, butyrate, pentanoate, hexanoate, enanthate, trimethylacetate, t-butylacetate, or stearate; methacrylate, octade-9-enoate, dichloroacetate, trichloroacetate, trifluoroacetate, aminoacetate, β-chloropropionate, phenoxyacetate, phenylacetate, β-phenylpropionate, cyclopentylpropionate, adamantoate, cyclohexylacetate, or benzoate wherein the benzoate ring may be substituted by nitro, methoxy, chloromethyl or alkyl of up to 3 carbon atoms, such as p-nitrobenzoate, p-methoxybenzoate, p-chloromethylbenzoate, p-methylbenzoate, 3,4-dimethylbenzoate, or p-isopropylbenzoate.

The novel compounds of Formula I are prepared according to the following outlined syntheses:

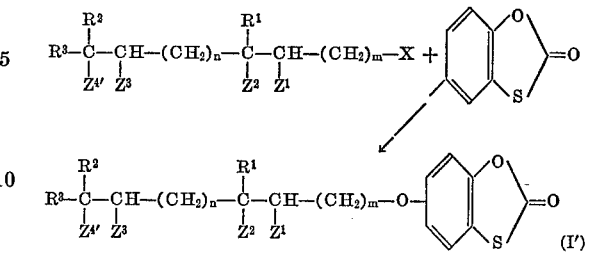

In the above formulas, each of $n$, $m$, $R^1$, $R^2$, $R^3$, $Z^1$, $Z^2$ and $Z^3$ is as defined above and $Z^{4'}$ is hydrogen, —$OR^4$ in which $R^4$ is lower alkyl, or, taken with $Z^3$, a carbon-carbon bond or oxido.

In the practice of the above outlined syntheses, an alkylating agent of Formula II (X is bromo, chloro, iodo, methanesulfonyloxy or tolylsulfonyloxy) is reacted with a salt of the 5-hydroxy-1,3-benzoxathiol-2-one (III) in an organic solvent inert to the reaction at about 0° to reflux temperature, to form the ether (I'). The reaction is generally carried out by first forming a salt by the addition of a base, such as potassium carbonate, sodium hydride, or the like, to the 5-hydroxy-1,3-benzoxathiol-2-one in an organic solvent, such as ether, tetrahydrofuran, dimethylformamide, dimethylacetamide, dimethylsulfoxide, or the like, followed by addition of the alkylating agent (II).

Epoxides ($Z^4$ taken with $Z^3$ is oxido) of Formula I are prepared by treatment of the terminal double bond of a compound of Formula II or I', wherein $Z^{4'}$ taken with $Z^3$ is a carbon-carbon bond, with m-chloroperbenzoic acid, perbenzoic acid, perphthalic acid, or the like.

Halides of Formula I ($Z^4$ is bromo, chloro or fluoro) are prepared by treating the terminal double bond of a compound of Formula I' with the appropriate dry hydrogen halide in an organic solvent.

Alkoxy derivatives of Formula I ($Z^4$ is —$OR^4$ in which $R^4$ is lower alkyl) are prepared by treating the terminal double bond of a compound of Formula II or I' with mercuric salt in the presence of the appropriate lower alcohol followed by reduction of the oxy-mercurial intermediate with sodium borohydride, hydrazine or sodium amalgam. Hydroxy derivatives of Formula I ($Z^4$ is —OH) are prepared by mercuric salt treatment of the terminal double bond of a compound of Formula I' in the presence of water followed by reduction of the oxy-mercurial intermediate. The thus-prepared hydroxy derivatives by reaction with carboxylic acid chloride, bromide or anhydride provides the compounds of Formula I, wherein $Z^4$ is —$OR^4$ in which $R^4$ is carboxylic acyl.

The preparation of 5-hydroxy-1,3-benzoxathiol-2-one can be accomplished as described by Lau and Kestner, J. Org. Chem. 33, 4426 (1968).

The novel compounds of Formula I are useful for the control of insects. The utility of these compounds as insect control agents is believed to be attributable to their juvenile hormone activity. They are preferably applied to the immature insect, namely—during the embryo, larvae or pupae stage in view of their ability to affect metamorphosis and reproduction and otherwise cause abnormal development. These compounds are effective control agents for Hemipteran, such as Lygaeidae, Miridae and Pyrrhocoridae; Coleopteran, such as Tenebrionidae; Lepidopteran, such as Pyralidae, Noctuidae and Gelechiidae; Dipteran, such as mosquitos; Orthoptera, such as roaches; and Homoptera, such as aphids. The compounds can be applied at dosage levels of the order of 0.1 $\mu$g. per insect. Suitable carrier substances include liquid or solid carriers, such as water, mineral or vegetable oils, talc, silica and natural or synthetic resin. The control of insects in accordance with the present invention is accomplished by spraying, dusting or exposing the insects to the vapor of the novel compounds. Generally, a concentration of less than 75% of the active compound is employed. The formulation can include insect attractants, emulsifying agents and wetting agents to assist in the application and efficiency of the active ingredient.

The following examples are provided to illustrate the present invention. Temperature is given in degrees centigrade.

EXAMPLE 1

To a mixture of 5.32 g. of 5-hydroxy-1,3-benzoxathiol-2-one and 6.5 g. of potassium carbonate, under nitrogen and at about 0°, is added 25 ml. of dimethylformamide followed by 5.3 g. of 3,7-dimethyloct-2,6-dienyl bromide. The mixture is then stirred at room temperature overnight and then filtered through sintered glass funnel. The filtrate is poured onto ice and extracted with hexane:ether (1:1). A trace of methanol is added and the extract washed with cold 2 N sodium hydroxide, water and brine, dried over magnesium sulfate and evaporated to yield 5-(3',7'-dimethyloct-2',6'-dienyloxy)-1,3-benzoxathiol-2 - one which can be purified by chromatography on Florisil.

EXAMPLE 2

To a solution of 330 mg. of 5-(3',7'-dimethyloct-2',6'-dienyloxy)-1,3-benzoxathiol-2-one in 8 ml. of methylene chloride, under nitrogen and cooled to 0°, is slowly added 229 mg. of m-chloroperbenzoic acid (85%) in about 5 ml. of methylene chloride. After about 30 minutes, the mixture is poured into 5% sodium sulfite, shaken and then separated. The organic phase is washed with saturated sodium bicarbonate and brine, dried over magnesium sulfate and evaporated to yield crude 5-(6',7'-oxido-3',7'-dimethyloct-2'-enyloxy)-1,3-benzoxathiol-2-one which is purified by chromatography eluting with hexane:ether.

EXAMPLE 3

A mixture of 1.68 g. of 5-hydroxy-1,3-benzoxathiol-2-one, 2.7 g. of potassium carbonate and about 25 ml. of dimethylformamide, under nitrogen, is prepared and thereafter 2.5 g. of the mesylate of 3,7-dimethyloct-6-en-1-ol is added. The reaction mixture is heated to about 75° for about six hours. The mixture is then poured onto ice and extracted with hexane:ether (1:1). The extract is washed with cold 2 N sodium hydroxide, water and brine, dried over calcium sulfate and evaporated to give 5-(3',7'-dimethyloct-6'-enyloxy)-1,3-benzoxathiol - 2 - one which is purified by chromatography eluting with hexane:ether.

EXAMPLE 4

A mixture of 1.68 g. of 5-hydroxy-1,3-benzoxathiol-2-one, 1.35 g. of potassium carbonate and about 25 ml. of dimethylformamide, under nitrogen, is prepared and after about 20 minutes, 2.5 g. of the mesylate of 3,7-dimethyloct-6-en-1-ol is added. The reaction mixture is then stirred at room temperature for six days. The mixture is filtered directly onto ice, water added and then extracted (3×) with ether:hexane (1:1). Extract washed with water and brine, dried over calcium sulfate and evaporated to yield 5-(3',7'-dimethyloct-6'-enyloxy)-1,3-benzoxathiol-2 - one which is purified by chromatography and then epoxidized using the process of Example 2 to give 5-(6',7'-oxido-3',7'-dimethyloctyloxy)-1,3-benzoxathiol-2-one.

EXAMPLE 5

The process of Example 4 is repeated using 6.06 g. of 5-hydroxy-1,3-benzoxathiol-2-one, 2 g. of potassium carbonate, 100 ml. of dimethylformamide and 10 g. of the mesylate of 3,7-dimethyloct-6-en-1-ol and heating at 60° for two days to give 5-(3',7'-dimethyloct-6'-enyloxy)-1,3-benzoxathiol-2-one.

The mesylate is prepared according to the procedure of Crossland and Servis, J. Org. Chem. 35, 3195 (1970) from the C–1 alcohol.

EXAMPLE 6

The mesylate of each of 3,7-dimethyloct-6-en-1-ol, 2,5-dimethylhex-4-en-1-ol, 3,7-dimethylnon-6-en-1-ol and 3-ethyl-7-methylnon-6-en-1-ol is reacted with 5-hydroxy-1,3-benzoxathiol-2-one using the process of Example 5 to prepare:

5-(3',7'-dimethyloct-6'-enyloxy)-1,3-benzoxathiol-2-one,
5-(2',5'-dimethylhex-4'-enyloxy)-1,3-benzoxathiol-2-one,
5-(3',7'-dimethylnon-6'-enyloxy)-1,3-benzoxathiol-2-one and
5-(3'-ethyl-7'-methylnon-6'-enyloxy)-1,3-benzoxathiol-2-one.

Each of the thus-prepared ethers is treated with m-chloroperbenzoic acid using the process of Example 2 to prepare the respective epoxides:

5-(6',7'-oxido-3',7'-dimethyloctyloxy)-1,3-benzoxathiol-2-one,
5-(4',5'-oxido-2',5'-dimethylhexyloxy)-1,3-benzoxathiol-2-one,
5-(6',7'-oxido-3',7'-dimethylnonyloxy)-1,3-benzoxathiol-2-one and
5-(6',7'-oxido-3'-ethyl-7'-methylnonyloxy)-1,3-benzoxathiol-2-one.

EXAMPLE 7

To a solution of 2 g. of 5-(3',7'-dimethylocta-2',6'-dienyloxy)-1,3-benzoxathiol-2-one in 20 ml. of ethanol, cooled to 0° by an ice-bath, is added a suspension of 2.3 g. of mercuric acetate in 50 ml. of ethanol over 15 minutes. The reaction mixture is stirred for two hours and then, with cooling, 1.2 g. of potassium hydroxide in 20 ml. of ethanol is added. Then 0.14 g. of sodium borohydride is added in small portions and stirring continued 30 minutes. The solution is decanted, then concentrated to half volume, diluted with water and extracted with ether. The ethereal phase is washed with water, dried over magnesium sulfate and the crude product chromatographed on silica using hexane:ether to yield 5-(7'-ethoxy-3',7'-dimethyloct-2'-enyloxy)-1,3-benzoxathiol-2-one.

The process of this example is repeated using each of the unsaturated ethers of Example 6 to prepare:

5-(7'-ethoxy-3',7'-dimethyloctyloxy)-1,3-benzoxathiol-2-one,
5-(5'-ethoxy-2',5'-dimethylhexyloxy)-1,3-benzoxathiol-2-one,
5-(7'-ethoxy-3',7'-dimethylnonyloxy)-1,3-benzoxathiol-2-one, and
5-(7'-ethoxy-3'-ethyl-7'-methylnonyloxy)-1,3-benzoxathiol-2-one.

The use of methanol in place of ethanol in the foregoing process provides the respective methoxy derivatives, e.g., 5-(7'-methoxy - 3',7' - dimethyloct-2'-enyloxy)-1,3-benzoxathiol-2-one and 5-(7'-methoxy - 3',7' - dimethyloctyloxy)-1,3-benzoxathiol-2-one.

EXAMPLE 8

To a mixture of 1.9 g. of mercuric acetate, 6 ml. of water and 20 ml. of tetrahydrofuran is added 1.4 g. of 5-(3',7'-dimethylocta-2',6'-dienyloxy) - 1,3 - benzoxathiol-2-one slowly. After addition is complete, the reaction mixture is stirred for about 20 minutes. The mixture is cooled to about 0° and 6 ml. of aqueous sodium hydroxide (3 molar) is added followed by 0.49 g. of sodium borohydride in aqueous sodium hydroxide (about 3 molar). The mixture is stirred for about 30 minutes. The mixture is then decanted, concentrated, diluted with water, dried over magnesium sulfate and the product chromatographed on silica to yield 5-(7'-hydroxy-3',7'-dimethyloct-2'-enyloxy)-1,3-benzoxathiol-2-one.

In the same way, there is prepared:

5-(7'-hydroxy-3',7'-dimethyloctyloxy)-1,3-benzoxathiol-2-one,
5-(5'-hydroxy-2',5'-dimethylhexyloxy)-1,3-benzoxathiol-2-one,
5-(7'-hydroxy-3',7'-dimethylnonyloxy)-1,3-benzoxathiol-2-one, and
5-(7'-hydroxy-3'-ethyl-7'-methylnonyloxy)-1,3-benzoxathiol-2-one.

EXAMPLE 9

A mixture of 1 g. of 5-(7'-hydroxy-3',7'-dimethyloct-2'-enyloxy)-1,3-benzoxathiol-2-one, 10 ml. of acetic anhydride and 0.5 g. of dry sodium acetate is refluxed for about five hours. After cooling, excess anhydride is removed by vacuum and the residue extracted with ether. The ethereal extract is washed, dried over magnesium sulfate and evaporated to yield the corresponding acetate [5-(7'-acetoxy - 3',7' - dimethyloct - 2' - enyloxy)-1,3-benzoxathiol-2-one].

By using propionic anhydride, butyric anhydride, n-hexanoic anhydride, and the like, the corresponding ester is prepared. Alternatively, esters can be prepared using acyl chloride, such as acetyl chloride in pyridine.

By use of the process of this example, other hydroxy compounds, such as those of Example 8 can be converted into the respective carboxylic ester.

EXAMPLE 10

Anhydrous hydrogen chloride is bubbled into 100 ml. of dry carbon tetrachloride at 0° until one equivalent is taken up. Five grams of 5-(3',7'-dimethylocta-2',6'-dienyloxy)-1,3-benzoxathiol-2-one is added and the resulting mixture allowed to stand for about 48 hours at 0°. The mixture is evaporated under reduced pressure to yield 5-(7'-chloro-3',7'-dimethyloct-2'-enyloxy)-1,3-benzoxathiol-2-one which is purified by chromatography.

Other chlorides of the present invention, such as 5-(7'-chloro-3',7'-dimethyloctyloxy)-1,3-benzoxathiol-2-one,
5-(5'-chloro-2',5'-dimethylhexyloxy)-1,3-benzoxathiol-2-one,
5-(7'-chloro-3',7'-dimethylnonyloxy)-1,3-benzoxathiol-2-one and
5-(7'-chloro-3'-ethyl-7'-methylnonyloxy)-1,3-benzoxathiol-2-one are prepared from the respective unsaturated precursor.

By using hydrogen bromide and hydrogen fluoride, the respective bromides and fluorides of the present invention are prepared.

EXAMPLE 11

The addition of water to the mesylate of 3,7-dimethyloct-6-en-1-ol is accomplished using the process of Example 8 to yield the C–1 mesylate of 3,7-dimethylocta-1,7-diol which is reacted with 5-hydroxy-1,3-benzoxathiol-2-one using the process of Example 5 to yield 5-(7'-hydroxy-3',7'-dimethyloctyloxy)-1,3-benzoxathiol-2-one.

EXAMPLE 12

(A) One hundred grams of 3,7-dimethyloct-6-en-1-ol are dissolved in 150 ml. of pyridine and 100 ml. of acetic anhydride and left at room temperature for about 48 hours. Then the mixture is extracted with ether and the ethereal extracts washed with water, 10% aqueous HCl and brine to yield 1-acetoxy-3,7-dimethyloct-6-ene which is purified by distillation.

(B) One hundred and fifty grams of mercuric acetate in 400 ml. of dry ethanol is added to 100 g. of 1-acetoxy-3,7-dimethyloct-6-ene (citronellol acetate) in 200 ml. of dry ethanol cooled in an ice-bath. The temperature is allowed to come to room temperature by standing overnight. Then the mixture is cooled to 0°, 100 g. of potassium hydroxide in 1.5 l. of ethanol is added followed by addition of 10 g. of sodium borohydride in small portions. After about 30 minutes at 0°, water (100 ml.) is added and mixture left at room temperature for two hours. The mixture is filtered, filtrate concentrated and extracted with ether. The ethereal extract is washed, dried and evaporated to yield 7-ethoxy-3,7-dimethyloctan-1-ol which is purified by distillation or chromatography.

By using methanol in the foregoing process in place of ethanol, there is obtained 7-methoxy-3,7-dimethyloctan-1-ol.

(C) To 10 g. of 7-ethoxy-3,7-dimethyloctan-1-ol in 250 ml. of methylene chloride and 10 ml. of triethylamine at —5° to 0° is added slowly 6.5 ml. of mesyl chloride. About 15 minutes after addition is complete, the reaction is worked up by pouring onto ice, washed with 10% HCl, saturated sodium bicarbonate, brine and dried to yield the mesylate.

The thus-prepared mesylate is used in the process of Example 5 to yield 5 - (7' - ethoxy - 3',7'-dimethyloctyloxy)-1,3-benzoxathiol-2-one.

In the same way, there is prepared 5-(7'-methoxy-3',7'-dimethyloctyloxy)-1,3-benzoxathiol-2-one.

EXAMPLE 13

A solution of 4.8 g. of 3,7-diethylnon-6-en-1-ol and 40 ml. of ether is added to 2.4 g. of phosphorus tribromide in ether at about —50° over about 30 minutes. The reaction mixture is stirred for two hours, poured onto ice and extracted with ether. The ether extracts are combined, washed with 10% sodium carbonate, water and saturated sodium chloride, dried over sodium sulfate and solvent removed to yield 3,7 - diethylnon-6-enyl bromide.

In the same way, there is prepared 3-methyl-7-ethylnon-6-enyl bromide.

EXAMPLE 14

Each of 3,7-diethylnon-6-enyl bromide, 3,7-diethylnona-2,6-dienyl bromide, 3 - methyl - 7-ethylnon-6-enyl bromide and 3 - methyl - 7 - ethylnona-2,6-dienyl bromide is used as the starting material in the process of Example 1 to yield:

5-(3',7'-diethylnon-6'-enyloxy)-1,3-benzozathiol-2-one,
5 - (3',7'-diethylnona-2',6'dienyloxy)-1,3-benzoxathiol-2-one,
5 - (3' - methyl - 7'-ethylnon-6' - enyloxy)-1,3-benzoxathiol-2-one and
5 - (3' - methyl - 7' - ethylnona-2',6'-dienyloxy)-1,3-benzoxathiol-2-one.

Using the process of Example 2, the epoxides of each of the thus-obtained ethers is prepared, i.e., 5 - (6',7'-oxido-3',7'-diethylnonyloxy)-1,3-benzoxathiol-2-one, etc.

EXAMPLE 15

Using the process of Example 1, 5-(3',7'-dimethyloctyloxy) - 1,3 - benzoxathiol - 2 - one is obtained from 3,7-dimethyloctyl bromide.

EXAMPLE 16

(A) To a solution of 20.9 g. of the ethylene ketal of 1 - bromo - 4 - pentanone (obtained by treating 1-bromo-4-pentanone with ethylene glycol in benzene in the presence of p-toluenesulfonic acid) in 100 ml. of benzene is added 20 g. of triphenylphosphine. The mixture is heated at reflux temperature for two hours and then filtered. The solid material thus-collected is washed with benzene, dried in vacuo and added to 6.49 g. of butyl lithium in 50 ml. of dimethylsulfoxide. The mixture is stirred until an orange solution is obtained and 38 g. of methyl ethyl ketone is then added. The mixture is stirred at about 25° for about eight hours, poured into water and extracted with ether. The ethereal phase is concentrated and the concentrate added to 0.1 N solution of hydrochloric acid in aqueous acetone and stirred for about 15 hours. The mixture is then poured into ice water and extracted with ethyl acetate. The extracts are combined, washed with water, dried over sodium sulfate and evaporated to yield 6-methyl-5-octen-2-one which is purified by chromatography and separated into the cis and trans isomer.

(B) A mixture of 11.2 g. of diethyl carbomethoxymethylphosphonate in 100 ml. of dimethylformamide is treated with 2.4 g. of sodium hydride. The mixture is stirred until the evolution of gas ceases and then 10 g. of 6 - methyl - 5 - octen-2-one is added slowly with stirring, maintaining temperature below 30°. The mixture is stirred for about one hour, then diluted with water and then extracted with ether. The ethereal phase is washed with water, dried over sodium sulfate and evaporated under reduced pressure to yield methyl 3,7-dimethylnona-2,6-dienoate as a mixture of isomers (trans, cis; trans,trans; cis,cis and cis,trans) which are separated by chromatography.

(C) A solution of 2 g. of methyl 3,7-dimethylnona-2,6-dienoate in 20 ml. of dry ether is added with stirring to 0.4 g. of lithium aluminum hydride covered in ether at 0°. After about two hours, 2.5 ml. of acetic acid is added. The mixture is washed with ice water and the ether phase is dried and evaporated to give 3,7-dimethylnona-2,6-dien-1-ol.

(D) A suspension of 0.5 g. of 5% palladium-on-carbon catalyst in 50 ml. of benzene is hydrogenated for 30 minutes. A mixture of 3,7-dimethylnona-2,6-dien-1-ol in 75 ml. of methanol is added and hydrogenated with agitation until the theoretical amount of hydrogen is absorbed. The catalyst is removed by filtration and the solution evaporated to yield a mixture containing the dihydro compounds which are separated by chromatography to yield 3,7-dimethylnon-6-en-1-ol.

The processes of Parts A, B and C are repeated starting with each of diethyl ketone, n-propylmethyl ketone, pentan-2-one, hexan-3-one and 2-methylpentan-3-one to yield 3-methyl-7-ethylnon-6-en-1-ol, 3,7-dimethyldec-6-en-1-ol, 3-methyl-7-ethyldec-6-en-1-ol and 3,8-dimethyl-7-ethylnon-6-en-1-ol, respectively, as the final product.

The synthesis of Parts A, B and C can be outlined as follows ($\phi$ is phenyl):

What is claimed is:
1. A compound selected from those of the following Formula I:

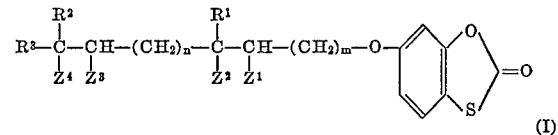

wherein:
each of $R^1$, $R^2$ and $R^3$ is lower alkyl;
$Z^1$ is hydrogen and $Z^2$ is hydrogen or, taken with $Z^1$, a carbon-carbon bond;
$Z^3$ is hydrogen;
$Z^4$ is hydrogen, bromo, chloro, fluoro, —$OR^4$ or, taken with $Z^3$, a carbon-carbon bond or oxido;
$n$ is the positive integer one, two or three;
$m$ is zero or the positive integer one or two, provided that when $m$ is zero—then $Z^2$ is hydrogen; and
$R^4$ is hydrogen, lower alkyl, alkanoyl of 1 to eighteen carbon atoms, methacryloyl, octadec - 9 - enoyl, dichloroacetyl, trichloroacetyl, trifluoroacetyl, aminoacetyl, $\beta$ - chloropropionyl, phenoxyacetyl, phenylacetyl, $\beta$-phenylpropionyl, cyclopentylpropionyl, adamantoyl, cyclohexylacetyl or benzoyl wherein the benzoyl ring may be substituted by nitro, methoxy, chloromethyl or alkyl of up to 3 carbon atoms.

2. A compound according to claim 1 wherein $m$ is one and $n$ is two.

3. A compound according to claim 2 wherein each of $Z^1$ and $Z^2$ is hydrogen and each of $R^1$, $R^2$ and $R^3$ is methyl or ethyl.

4. A compound according to claim 3 wherein $Z^4$ taken with $Z^3$ is a carbon-carbon bond or oxido.

5. A compound according to claim 4 wherein each of $R^1$, $R^2$ and $R^3$ is methyl.

6. A compound according to claim 3 wherein $Z^4$ is hydrogen, chloro or —$OR^4$ in which $R^4$ is hydrogen or lower alkyl of one to four carbon atoms.

7. A compound according to claim 6 wherein each of $R^1$, $R^2$ and $R^3$ is methyl.

8. A compound according to claim 7 wherein $Z^4$ is chloro or —$OR^4$.

9. A compound according to claim 2 wherein $Z^2$ taken with $Z^1$ is a carbon-carbon bond and each of $R^1$, $R^2$ and $R^3$ is methyl or ethyl.

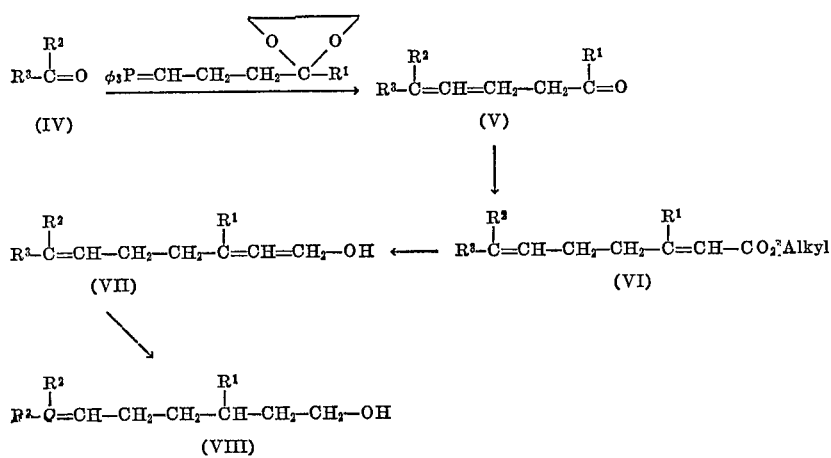

10. A compound according to claim 9 wherein $Z^4$ is hydrogen, chloro, —$OR^4$ or, taken with $Z^3$, a carbon-carbon bond or oxido and $R^4$ is hydrogen or lower alkyl of one to four carbon atoms.

11. A compound according to claim 10 wherein $Z^4$ is chloro.

12. A compound according to claim 10 wherein $Z^4$ is —$OR^4$.

13. A compound according to claim 10 wherein $Z^4$ taken with $Z^3$ is a carbon-carbon bond or oxido.

14. A compound according to claim 13 wherein each of $R^1$, $R^2$ and $R^3$ is methyl.

15. A compound according to claim 1 wherein $m$ is zero or one; $n$ is one; each of $R^1$, $R^2$ and $R^3$ is methyl or ethyl and $Z^4$ taken with $Z^3$ is a carbon-carbon bond or oxido.

16. A compound according to claim 15 wherein $m$ is zero.

17. A compound according to claim 16 wherein each of $R^1$, $R^2$ and $R^3$ is methyl.

References Cited

UNITED STATES PATENTS 3,563,982    2/1971    Bowers _____ 260—340.5

HENRY R. JILES, Primary Examiner

C. M. S. JAISLE, Assistant Examiner

U.S. Cl. X.R.

260—240 H; 424—276